United States Patent [19]
Bracesco

[11] Patent Number: 5,372,668
[45] Date of Patent: Dec. 13, 1994

[54] METHOD AND APPARATUS FOR MANUFACTURE OF A PADDED ELEMENT, PARTICULARLY FOR A MOTOR-VEHICLE SEAT

[75] Inventor: Roberto Bracesco, Turin, Italy

[73] Assignee: Sepi S.p.A., Turin, Italy

[21] Appl. No.: 158,288

[22] Filed: Nov. 29, 1993

[30] Foreign Application Priority Data

Mar. 29, 1993 [IT] Italy ............................ TO93A000210

[51] Int. Cl.⁵ ...................... B29C 65/10; B32B 31/12; B32B 31/20
[52] U.S. Cl. ........................... 156/214; 156/212; 156/256; 156/285; 156/290; 156/308.8; 156/497; 156/513; 156/529; 156/581; 297/DIG. 1; 297/DIG. 2
[58] Field of Search ............... 156/212, 214, 497, 500, 156/285, 290, 308.4, 308.8, 256, 513, 529, 581; 297/DIG. 1, DIG. 2

[56] References Cited

U.S. PATENT DOCUMENTS

| | | | |
|---|---|---|---|
| 4,692,199 | 9/1987 | Kozlowski et al. | 156/245 |
| 4,786,351 | 11/1988 | Elliott et al. | 156/497 X |
| 4,844,761 | 7/1989 | Bracesco | 156/290 X |
| 5,232,543 | 8/1993 | Frelich et al. | 156/497 |
| 5,254,197 | 10/1993 | Klems | 156/285 X |

Primary Examiner—Michael W. Ball
Assistant Examiner—Adrienne C. Johnstone
Attorney, Agent, or Firm—Sughrue, Mion, Zinn, Macpeak & Seas

[57] ABSTRACT

A padded element of a motor-vehicle seat is made applying a cover onto a padding body by pressing with simultaneous application of steam. The covering fabric is provided on a lower mould with the back side thereof facing upwardly and the padding body is pressed against this back side by an upper mould. The upper mould includes a plurality of cannulae for steam injection, which project downwardly from the upper mould and are introduced through the padding body and have their steam outlet lower ends located inside this body adjacent to the surface thereof.

5 Claims, 2 Drawing Sheets

METHOD AND APPARATUS FOR MANUFACTURE OF A PADDED ELEMENT, PARTICULARLY FOR A MOTOR-VEHICLE SEAT

BACKGROUND OF THE INVENTION

The present invention generally refers to padded elements used in motor-vehicles, comprising a padding body, usually made of foamed plastic material, and a cover applied thereon. The invention particularly relates to a method and apparatus for manufacture of a padded element, particularly for a motor-vehicle seat, of the type wherein a cover is applied onto a padding body and the cover is formed according to the shape of the surface of the padding by pressing in a mold and simultaneous application of a flow of steam. The invention however applies also to other padded elements used in motor-vehicles, such as door panels, roof panels, and dashboard panels.

By the term "padded element" of a motor-vehicle seat, reference is made in the present description and in the following claims either to the seat portion or the backrest portion of the seat. This element is formed by a padding body, usually made of foamed plastic material, on which there is applied a cover (made of fabric, skin, or synthetic material) which may be provided on its back with a relatively thin and soft layer of foamed plastic material.

According to the most conventional technique, the padding body of the seat element is covered with a fabric which is secured to the body of foamed plastic material by sewing or by means of an adhesive material or by fixing elements which connect the cover to the body of foamed plastic material. These last two techniques have the advantage, with respect to the most conventional technique which provides the sewing of the cover, to be more adapted to mass production and to allow in particular the manufacturing process to be automated, while enabling the production of complex anatomical shapes, which answer to ergonomic and comfort needs. On the other hand, said know processes imply the risk, following the connection of the covering fabric to the surface of the padding element, that the fabric is torn, if it is not elastic.

In order to solve this problem, it has been proposed to use a thermo-formable material for covering the padding of foamed plastic material. This fabric is initially heated and then formed according to the desired shape by cold pressing in a mold. The fabric formed thereby is then connected to the body of foamed plastic material. This known method however has the drawback of requiring the use of a thermo-formable fabric, which is of a relatively high cost, and to prevent the use of fabrics having decorative designs, since such designs are deformed in the thermo-forming operation.

A solution to the problem of providing a cushion with a complex shape while adopting a regular non-elastic fabric as a cover, and avoiding the risk of tears and/or lacerations of the fabric when it is coupled to the padding, lies in forming the covering fabric, before application thereof to the padding, by a heat pressing operation with application of steam. A method of this type is disclosed in FR-A-2,347,306. If on one hand the simple idea of imparting a determined shape to an non-elastic fabric by heat pressing with steam is surely an obvious step for a skilled man in the art of fabric forming, given that it is the conventional method used, also at home, when forming fabrics of clothes, as well as covering fabrics in general, on the other hand, it must be pointed out that the practical application on an industrial scale of this idea is not absolutely easy. Various tests have shown indeed that the above mentioned method, as it is described in FR-A-2,347,306, cannot be used practically in the industry, since it implies a high risk that the steam which is applied during the pressing of the fabric tends at least partially to condense on the fabric itself, giving origin to stains.

The above mentioned problem has been overcome with the method and apparatus forming the subject of Italian patent application No. 67757-A/86 of Oct. 6, 1986 and in the corresponding U.S. Pat. No. 4,844,761. According to this solution, the cover is initially applied to a lower mold which is provided with an apparatus for injecting steam on the cover during pressing. The steam is caused to come to passages formed in the lower mold by being taken from a reservoir of steam under pressure which is remote with respect to said passages and whose body is however able to transfer heat by thermal conduction and by radiation to the wall of the lower mold. In this way, the risk of dew formation and resulting stains on the fabric is reduced at minimum, since the wall of the lower mold is kept efficiently and constantly at high temperature, due to the heat transmission from the body of the steam reservoir to said upper wall. At the same time, a prolonged contact of the steam with the fabric is avoided, since the pressure chamber of the steam reservoir is not in direct communication with the passages formed in said upper wall. After the covering fabric is formed, the latter is applied to the padding of foamed plastic material by glueing with the aid of an adhesive.

Tests have shown that this last known method is very good in order to solve the technical problems which have been disclosed above. However it is not completely satisfactory from the point of view of economy of manufacture, when an automated mass-production is to be prepared. Indeed, when the above described method is to be carried out in a production line, it is necessary to provide, for each padding body to be covered, a relatively complicated lower mold equipment, provided with said devices for injecting steam and the associated reservoir of steam under pressure, which causes very high investments and does not provide for flexibility of production. A further drawback of the method disclosed in U.S. Pat. No. 4,844,761 lies in that it does not allow the use of sheets of adhesive material of the so called "hot-melt" type, in lieu of the conventional adhesive for glueing the cover on the padding body. These sheets must be interposed between the parts to be glued and melt when a predetermined temperature is passed so as to provide glueing. The advantage thereof lies in that they provide a "reversible" glueing, i.e. they allow at a later stage unglueing of the cover by application of heat. With said known device, the heated steam injection stage is provided during pressing the cover between two molds, without the padding body being present. Therefore, if a "hot-melt" sheet is applied to the cover at this stage, it would melt over the metal mold which is pressed thereagainst. Therefore, it would be necessary to provide an additional operation for applying the "hot-melt" sheet, following the stage of steam application.

Finally, a further drawback of the method forming the subject of the above identified Italian patent application lies in that it must be necessarily divided in two stages, i.e. a first stage in which the sole cover is formed by heat pressing with injection of steam and a second stage in which the padding body is glued on the previously formed cover.

SUMMARY OF THE INVENTION

The object of the present invention is that of keeping all the advantages of the method and apparatus disclosed in U.S. Pat. No. 4,844,761, while overcoming at the same time all the drawbacks which have been cited above.

In order to achieve this object, the invention provides a method for the manufacture of a padded element, particularly for a motor-vehicle seat, wherein a cover is applied onto a padding body and wherein the cover is formed according to the shape of the surface of the padding by pressing in a mold and simultaneously applying a flow of steam, characterised in that:

the cover is initially applied on a lower mold with the back side thereof facing upwardly, the padding body is pressed against the back side of the cover so arranged, by lowering onto the lower mold an upper mold on which said padding body has been previously positioned, an adhesive being interposed between the padding body and the back side of the cover, simultaneously with the pressing of the padding body against the back side of the cover, steam is injected through at least one cannula projecting downwardly from the upper mold, said at least one cannula passing through the padding body and terminating inside such body, adjacent to the surface of the padding body which is in contact with said cover.

Preferably, said at least one cannula is remote with respect to a reservoir of steam under pressure which is associated with the upper mold, said mold being however in a heat transmission relationship to the reservoir body, so as to avoid the risk of condensation of steam when it first arrives to the initially cold mold after the start of the plant.

A first advantage of the method according to the invention lies in that the steam injection apparatus is associated with the upper mold rather than with the lower mold, as in the case of the above mentioned U.S. patent. This difference gives raise to relevant results from the standpoint of the economy of the plant in the case of a mass-production. Indeed, the lower mold has a greatly simplified structure and may be provided for example also of plastic material. It is then possible to provide a plurality of lower molds which are caused to advance along a mass-production line, each lower mold being adapted to receive a corresponding cover. The plant may include a single pressing station, in which there is provided a single upper mold with the steam injection devices associated therewith. The lower molds with the covers applied thereon are carried in sequence to the upper mold, which is provided at each time with a padding body and then lowered in order to provide the connection to the cover. Said operation cycle may be provided by a line arrangement, or also by a rotating platform arrangement.

A further advantage deriving from the process according to the invention lies in that the steam pressing of the cover and the application of the padding body to the cover are provided simultaneously at a single stage, which increases rapidity of operation and gives the further possibility of adopting hot-melt sheets to provide the reversible glueing of the cover to the padding body.

The upper mold is preferably provided with a plurality of cannulae which are able to pierce the foamed material constituting the padding body so as to provide a gripping action on the latter as well as the following injection of steam adjacent to the fabric.

Another difference with respect to the method disclosed in U.S. Pat. No. 4,844,761 lies in that the steam arrives at the fabric from its back side, so that the method can be applied also to fabrics, such as velvet, or to skins, which are deteriorated following application of steam by the said known method.

Tests conducted by the applicant have also shown that by injecting steam inside the padding body, immediately adjacent to the cover, a local bulging of the padding body is obtained and a shrinking of the covering fabric, so as to obtain a perfect meeting between cover and padding body at each portion of the latter, also when the shape of the padding body is relatively complicated.

The present invention also provides an apparatus for carrying out the above described method. More specifically, the invention also provides an apparatus for use in the manufacture of a padded element of a motor-vehicle seat, comprising a lower mold and an upper mold, means for pressing the upper mold and the lower mold against each other and means for injecting steam between the two molds during pressing, characterised in that said means for injecting steam are associated with the upper mold and includes a plurality of cannulae projecting downwardly from the upper mold, said cannulae being arranged to be inserted through the padding body, so as to hold it on the upper mold, with their outlet ends terminating inside the padding body immediately adjacent to the surface of the latter, said cannulae being arranged for connection to a steam reservoir.

As already indicated, the invention also relates to a plant for carrying out the method for a mass-production, which includes a plurality of lower molds, an upper mold and means for bringing said lower molds in sequence to said upper mold to provide the above described pressing operation.

BRIEF DESCRIPTION OF THE DRAWINGS

Further features and advantages of the invention will become apparent from the following description with reference to the annexed drawings, given purely by way of non limiting example, in which.

DETAILED DESCRIPTION OF THE INVENTION

Figure 1:
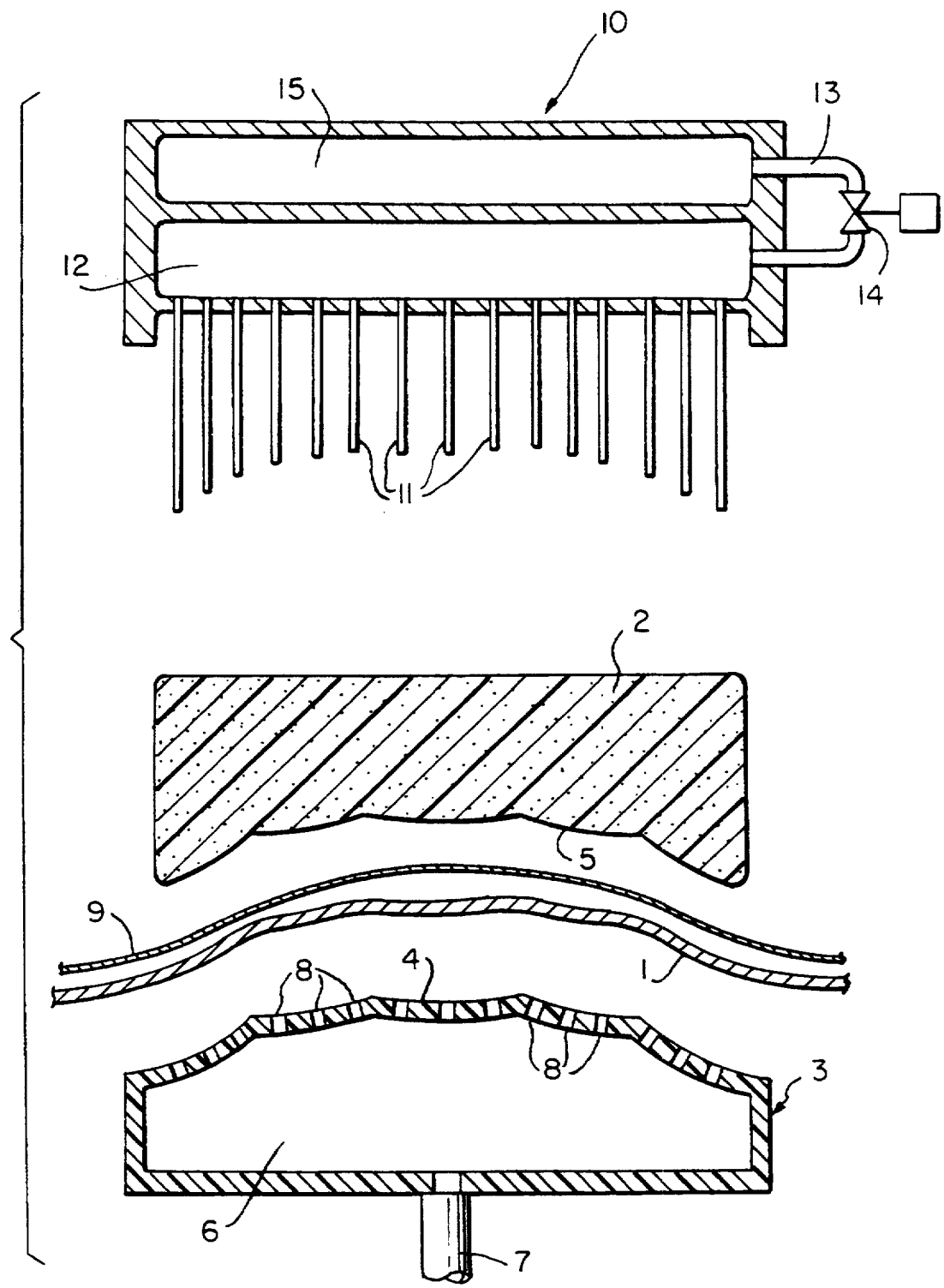
FIG. 1 is a diagrammatic cross-sectional view of an apparatus according to the invention in a first operative condition.
Figure 2:
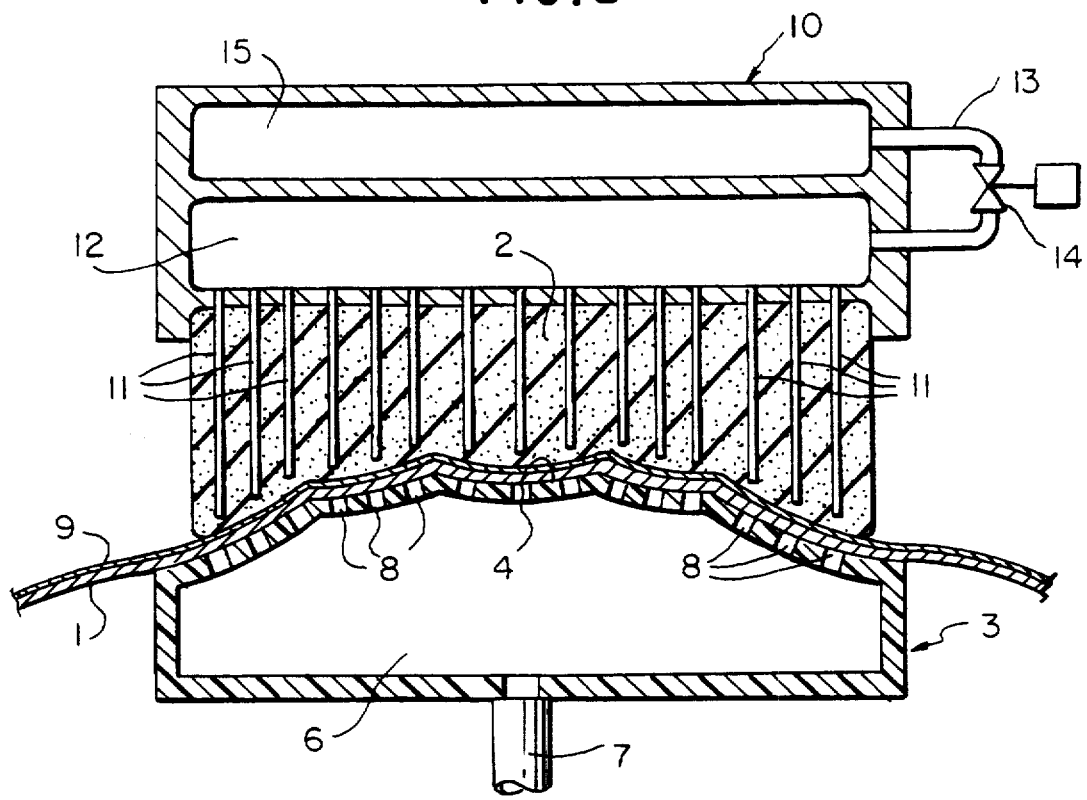
FIG. 2 is a cross-sectional view of the apparatus of FIG. 1 in a second operative condition.

With reference to FIGS. 1, 2, reference numeral 1 generally designates a covering fabric for a body of foamed plastic material 2 which is to form the padding of a seat portion of a motor-vehicle seat.

According to the invention, the fabric 1 is initially arranged on a lower mold 3 having a shape corresponding to that of the surface of the padding body 2. The fabric 1 is applied onto the lower mold 3, which has an upper wall 4 having a shape corresponding to that of surface 5 of the padding body 2. The fabric 1 is preferable kept in tight contact with wall 4 by communicating the inner cavity 6 of the lower mold 3 to a vacuum source (not illustrated), by a conduit 7. The cavity 6 also is communicated to a plurality of holes 8 formed in the wall 4, which enable the cloth 1 to be sucked against the wall 4 when vacuum is applied to chamber 6.

In the illustrated embodiment, the lower mold 3 is made of plastics.

Also according to the invention, above the back side of the cover 1 there is applied an adhesive sheet of the "hot-melt" type 9, which is to provide the reversible glueing of cover 1 onto the padding body 2 simply as a result of the injection of steam.

Reference numeral 10 generally designates an upper mold comprising a plurality of cannulae 11 projecting downwardly and communicated to a first chamber 12 of mold 10. The first chamber 12 can be connected by a conduit 13 and an intercepting valve 14 to a reservoir of steam under pressure 15. Similar to what is disclosed in U.S. Pat. No. 4,844,761, reservoir 15 is spaced apart from the steam outlet passages (in the present instance cannulae 11) so as to avoid any risk of condensation of the steam. Furthermore, the reservoir 15 is also able to heat the upper wall of the mold 10 by thermal conduction and by radiation, so that there is no risk that the steam condenses immediately after the start of the plant as a result of the contact of the steam with cannulae 11, which are initially cold.

Cannulae 11 are provided both to enable the steam to be injected when the padding body 2 is pressed against the cover 1, and to provide a gripping means for the padding 2 which enables this padding 2 to be held on the upper mold 10.

According to the method of the invention, the padding body 2 is then associated initially with the upper mold 10 by introducing cannulae 11 through the foamed plastic material of body 2. The shape of body 2 and cannulae 11 is such that the latter pierce through body 2 and terminates inside such body, adjacent to the outer surface 5. Mold 10 is then lowered onto the lower mold 3 on which there has been previously provided cover 1 with the back side thereof facing upwardly, and, if desired, along with a hot-melt adhesive sheet 9. Cover 1 is thus pressed against padding body 2 and simultaneously valve 14 is opened to enable the passage of steam under pressure from reservoir 15 to chamber 12 and from chamber 12 into cannulae 11. The steam exits from cannulae 11, passes through the foamed material of body 2 and arrives at the hot-melt sheet 9 and cover 1, providing the forming of the cover according to the shape of the padding body 2. In lieu of the hot-melt sheet 9 it is obviously possible to provide an adhesive material which is previously distributed on the surface 5 of the padding body 2 or on the back side of cover 1.

When pressing has taken place, the upper mold 10 is raised so as to separate the padding body 2 with the cover 1 applied thereon from the lower mold 3. Naturally, during this stage, the connection of chamber 6 to the vacuum source is interrupted and, if desired, presurized air can be pumped into chamber 6 to make the separation of cover 1 from wall 4 of the lower mold 3 easier. Alternatively, the padding body 2 is held on the lower portion 3 by keeping the vacuum within mold 3.

Figure 3:
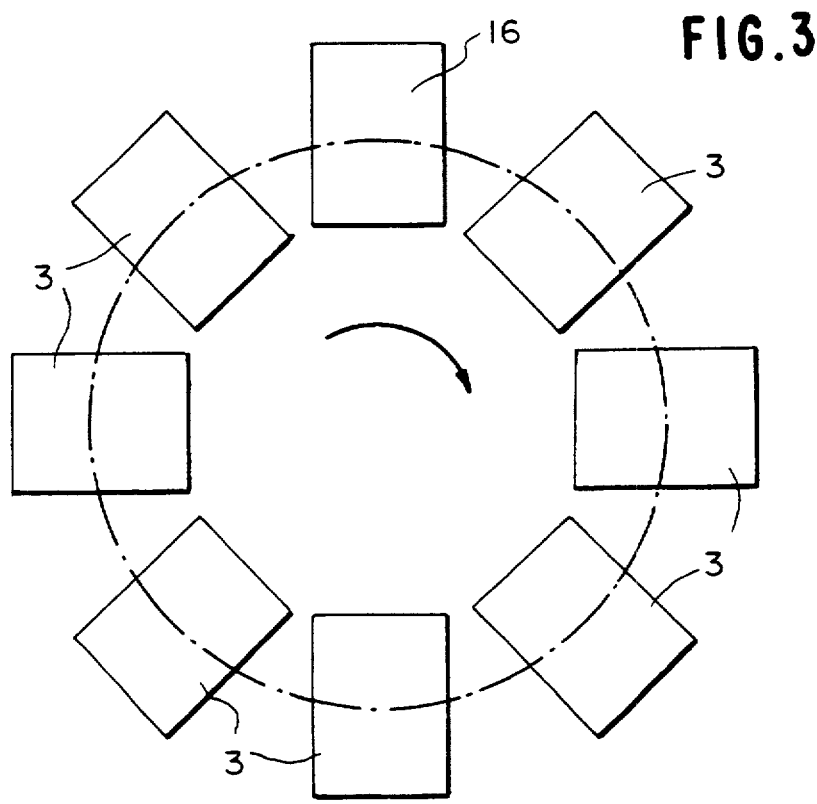
FIG. 3 is a diagrammatic view of a gross production plant made according to the present invention.

As it is clearly apparent from the foregoing description, in the method according to the invention, the forming operation by steam pressing of the cover 1 is provided simultaneously with the application of the padding body 2. Furthermore, the relatively complicated equipment of the various devices for feeding steam is associated with the upper mold, which enables the lower mold to be made in a relatively simple and economic way. It is thus possible to provide for example a plant of the type illustrated in FIG. 3 including a rotating platform on which there are provided a plurality of lower molds 3 each for receiving a cover 1 thereon. The plant includes a single station 16 for application of padding bodies 2 where there is provided the upper mold 10. The lower molds 3 are brought in sequence under the upper mold 10 of station 16 which at each time is provided with a new padding body 2. Once each pressing operation has been carried out, the upper mold 10 of station 16 is raised, the padding body 2 with the cover 1 associated therewith is sent towards the exit of the plant and a new padding body is mounted on the upper mold. All said operations may naturally be carried out by automatic and/or programmable devices.

In order to position body 2 on the mold 10, it is preferable to provide a provisional support structure for body 2, having a shape similar to that of mold 3. Once the body 2 has been placed on such structure, the mold 10 is lowered thereon, so that cannulae 11 pierce the body 2, so as to be able to bring it over the mold 3.

As already indicated in the foregoing, since in the method according to the invention the steam arrives at cover 1 from the back side thereof, there is no risk that it ruins the outer surface of the fabric or the skin constituting the cover, also when the fabric is for example constituted by a velvet. Furthermore, the steam injected into the body of foamed plastic material causes a local bulging of the latter which, along with the corresponding shrinking of the fabric originated by the steam wetting, gives rise to a perfect mating between padding body and cover.

Naturally, the details of construction and the embodiments may widely vary with respect to what has been described and illustrated purely by way of example, without departing from the scope of the present invention.

What is claimed is:

1. In a method for manufacture of a padded element, particularly for a motor-vehicle seat, wherein a cover is applied on a padding body and wherein the cover is formed according to the shape of the surface of the padding by a pressing operation in a mold and simultaneous injection of a flow of steam, the improvement wherein:
   the cover is initially applied on a lower mold with a back side of the cover facing upwardly,
   the padding body is pressed against the back side of said cover by lowering onto the lower mold an upper mold on which said padding body has been previously positioned, adhesive being interposed between said cover and the padding body,
   simultaneously with the pressing of the padding body against the back side of the cover, steam is injected through at least one cannula projecting downwardly from the upper mold, which is arranged through the padding body and terminates inside this body, adjacent to the surface of the padding body.

2. Method according to claim 1, wherein during said steam injection operation, steam is taken from a reservoir of steam under pressure located remote from said at least one cannula in such a way however that it enables a heat transmission from the wall of said reservoir to said at least one cannula.

3. Method according to claim 1, wherein said cover is kept in tight contact with the lower mold by applying a vacuum.

4. Method according to claim 1, wherein said at least one cannula is arranged to hold said padding body on the upper mold when inserted through the padding body.

5. Method according to claim 1, wherein said adhesive is constituted by a sheet of the hot-melt type to provide a reversible glueing of the cover.

* * * * *